(12) United States Patent
He

(10) Patent No.: US 7,599,454 B2
(45) Date of Patent: Oct. 6, 2009

(54) METHOD AND APPARATUS FOR SYMBOL ALIGNMENT IN DIVERSITY SIGNAL RECEPTION

(75) Inventor: Shousheng He, Södra Sandby (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 637 days.

(21) Appl. No.: 11/491,832

(22) Filed: Jul. 24, 2006

(65) Prior Publication Data

US 2008/0019467 A1    Jan. 24, 2008

(51) Int. Cl.
 *H04B 1/10* (2006.01)
 *H04L 7/00* (2006.01)
(52) U.S. Cl. .................... 375/347; 375/355
(58) Field of Classification Search ............ 375/260, 375/267, 347, 349, 355
See application file for complete search history.

(56) References Cited

U.S. PATENT DOCUMENTS

| | | | |
|---|---|---|---|
| 6,842,421 B1 | 1/2005 | Sarraf et al. | |
| 6,944,245 B2 | 9/2005 | Stewart et al. | |
| 6,944,434 B2 | 9/2005 | Mattellini et al. | |
| 7,133,457 B2* | 11/2006 | Singh et al. | 375/260 |
| 7,522,653 B2* | 4/2009 | Griffin et al. | 375/147 |
| 2004/0120387 A1 | 6/2004 | Bultan et al. | |
| 2004/0170234 A1 | 9/2004 | Pukkila et al. | |
| 2004/0192215 A1 | 9/2004 | Onggosanusi et al. | |
| 2005/0095985 A1 | 5/2005 | Hafeoz | |
| 2005/0152485 A1 | 7/2005 | Pukkila et al. | |
| 2005/0232174 A1 | 10/2005 | Onggosanusi et al. | |
| 2006/0056549 A1 | 3/2006 | Arslan et al. | |

FOREIGN PATENT DOCUMENTS

EP    0430481    6/1991

(Continued)

OTHER PUBLICATIONS

Makundi, M., Laakso, T. And Hjørugnes, A., "Generalized Symbol Synchronization Using Variable IIR and FIR Fractional-Delay Filters With Arbitrary Oversampling Ratios.", Proceedings of the IEEE International Conference on Acoustics, Speech, and Signal Processing (ICASSP'04), May 17-21, 2004, pp. 405-408, vol. 2.

(Continued)

*Primary Examiner*—David B Lugo
(74) *Attorney, Agent, or Firm*—Coats & Bennett, P.L.L.C.

(57) ABSTRACT

Methods and apparatus taught herein provide for symbol alignment between diversity signals in a communication receiver. For example, in one embodiment, a method of symbol aligning diversity signals in a communication receiver comprises generating diversity sample sets for a received signal and hypothesizing two or more relative symbol alignments for the diversity sample sets. The method further includes jointly determining a preferred relative symbol alignment and a preferred synchronization position for the diversity sample sets by evaluating a function that is dependent on relative symbol alignment and synchronization position according to the hypothesized relative symbol alignments and a number of candidate synchronization positions. In one embodiment, a burst-type communication receiver uses Single-Antenna-Interference-Cancellation (SAIC) processing, and over-samples the received signal to obtain the diversity sample sets as sub-channels of the received signal. A diversity processor in the receiver jointly determines the best relative symbol alignment and synchronization position.

44 Claims, 6 Drawing Sheets

FOREIGN PATENT DOCUMENTS

| EP | 1 475 932 A2 | 11/2004 |
| EP | 1530306 | 5/2005 |
| EP | 1 569 399 A1 | 8/2005 |
| WO | WO 2005/041511 A1 | 5/2005 |
| WO | 2006/136875 | 12/2006 |

OTHER PUBLICATIONS

Makundi, M., Laakso, T. And Hjørugnes, A., "Iterative Symbol Synchronization Using Variable IIR and FIR Fractional-Delay Filters with Arbitrary Oversampling Ratios." $1^{st}$ International Symposium on Wireless Communication Systems, Sep. 20-22, 2004, pp. 105-109.

Hoeher, P. et. al., "Single-Antenna Co-Channel Interference Cancellation for TDMA Cellular Radio Systems." IEEE Wireless Communications, Apr. 2005, pp. 30-37, vol. 12, No. 2.

Mostafa, A., "Single Antenna Interference Cancellation (SAIC) Method in GSM Network." IEE Vehicular Technology Conference, 2004, 2 pages.

Astély, D., Jakobsson, A., and Swindlehurst, A., "Burst Synchronization On Unknown Frequency Selective Channels With Co-Channel Interference Using An Antenna Array." IEEE Vehicular Technology Conference, May 1999, 3 pages.

3 Generation Partnership Project, TS 45.005. "Technical Specification Group GSM/EDGE Radio Access Network; Radio Transmission and Reception (Release 6)." Jun. 2005, 128 pages, V6.11.0.

Schon, M., "Oversampling Diversity in GERAN." Master Thesis, Signals and Systems, 2001, 56 pages, Uppsala University.

\* cited by examiner

HYPOTHESIS 1

| 0 | 1 | 2 | 3 | 4 | ... | n | ... | N |
|---|---|---|---|---|-----|---|-----|---|
| 1 | 1 | 2 | 3 | 4 | ... | n | ... | N |
| 2 | 1 | 2 | 3 | 4 | ... | n | ... | N |
| 3 | 1 | 2 | 3 | 4 | ... | n | ... | N |

*FIG. 8A*

HYPOTHESIS 2

| 0 | 1 | 2 | 3 | 4 | ... | n | ... | N | | ← SHIFT |
|---|---|---|---|---|-----|---|-----|---|---|---|
| 1 |   | 1 | 2 | 3 | 4   | ... | n | ... | N | |
| 2 |   | 1 | 2 | 3 | 4   | ... | n | ... | N | |
| 3 |   | 1 | 2 | 3 | 4   | ... | n | ... | N | |

*FIG. 8B*

HYPOTHESIS 3

| 0 | 1 | 2 | 3 | 4 | ... | n | ... | N |   | ← SHIFT |
|---|---|---|---|---|-----|---|-----|---|---|---------|
| 1 | 1 | 2 | 3 | 4 | ... | n | ... | N |   |         |
| 2 |   | 1 | 2 | 3 | 4   | ... | n | ... | N |       |
| 3 |   | 1 | 2 | 3 | 4   | ... | n | ... | N |       |

*FIG. 8C*

HYPOTHESIS 4

| 0 | 1 | 2 | 3 | 4 | ... | n | ... | N |   | ← SHIFT |
|---|---|---|---|---|-----|---|-----|---|---|---------|
| 1 | 1 | 2 | 3 | 4 | ... | n | ... | N |   |         |
| 2 | 1 | 2 | 3 | 4 | ... | n | ... | N |   |         |
| 3 |   | 1 | 2 | 3 | 4   | ... | n | ... | N |       |

*FIG. 8D*

METHOD AND APPARATUS FOR SYMBOL ALIGNMENT IN DIVERSITY SIGNAL RECEPTION

TECHNICAL FIELD

The present invention generally relates to communication receivers, and particularly relates to symbol alignment in diversity-based communication receivers.

BACKGROUND

Diversity receivers exploit transmit redundancy to gain reception performance improvements. For example, so-called multi-branch receivers generally include two or more receive antennas, with each antenna providing an antenna-specific version of the same received signal. Assuming some minimal spatial separation for the antennas, the received signal exhibits generally uncorrelated fading behavior across the antennas, and each antenna thus provides a different diversity signal for processing.

Multi-antenna designs, however, bring with them inherent cost disadvantages. Further, as a practical matter, fitting even the first decently performing antenna into a small portable communication device is challenge enough. Few designers welcome the added burden of finding room for additional, spatially separated diversity antennas.

However, a receiver can operate with a form of diversity reception even without the presence of multiple receiver antennas. For example, the in-phase (I) and quadrature (Q) components of a received signal can be treated as diversity signals in a Spatial-Temporal-Whitening (STW) process. Indeed, STW processing represents a core aspect of the Single-Antenna-Interference-Cancellation techniques of particular interest in certain types of wireless communication networks, such as GSM and EDGE networks.

Such networks use of form of Time-Division-Multiple-Access (TDMA) transmission wherein multiple users in the same cell or sector share the same carrier frequency, but are assigned different times—slots—for transmitting and receiving data. However, frequency reuse within the network means that nearby sectors use the same frequencies and time slots to transmit different data to other users, giving rise to significant levels of co-channel interference, which, along with adjacent-channel interference caused by spectral splatter and other phenomena, constrains system capacity and/or compromises service quality.

Better interference cancellation in these and other types of communication networks directly improves network capacity and service quality. Thus, considerable interest surrounds the topic of improved receiver performance. For example, the Downlink Advanced Receiver Performance (DARP) standard significantly tightens the performance requirements for interference cancellation for receivers of the type operating in GSM/EDGE systems.

Over-sampling represents one mechanism for further improving SAIC processing, as a means of meeting enhanced interference cancellation performance required by the DARP standard. Sampling the received signal at a multiple of the minimum sampling rate "artificially" creates diversity signals, i.e., diversity sample sets, wherein each diversity signal represents a different sampling phase of the over-sampled signal.

Whether artificially created through over-sampling, or whether derived from multiple receiver antennas, the use of diversity signals can improve receiver performance. However, one typical assumption, particularly in the case of over-sampling receivers, is that the diversity signals naturally are symbol aligned with one another. However, delay variations in the propagation channel, sampling phase mismatches in anti-aliasing filters, analog-to-digital converter and decimation filter mismatches, etc., can all contribute to symbol misalignment between the diversity signals. Thus, the assumption of natural symbol alignment between the diversity signals may be incorrect, meaning that any signal combining or other diversity-processing operations performed on the diversity signal will yield less-than-optimum results.

SUMMARY

Methods and apparatus taught herein provide for symbol alignment between diversity signals in a communication receiver. Recognizing that a better symbol alignment may exist for a specific channel realization allows the communication receiver to improve its received signal processing performance. The receiver further gains computational efficiency by employing a joint determination of preferred relative symbol alignment and synchronization position for processing the diversity signals. Computational efficiency of that joint determination is further improved in at least some embodiments by recognizing that the range of possible symbol alignments may be constrained, such as where phase-ordered over-sampling is used to generate the diversity signals.

Thus, one embodiment of a method of symbol aligning diversity signals in a communication receiver comprises generating diversity sample sets for a received signal and hypothesizing two or more relative symbol alignments for the diversity sample sets. The method further includes jointly determining a preferred relative symbol alignment and a preferred synchronization position for the diversity sample sets by evaluating a function that is dependent on relative symbol alignment and synchronization position according to the hypothesized relative symbol alignments and a number of candidate synchronization positions.

Thus, one or more embodiments of a communication receiver circuit, which may be included in a wireless communication device, include one or more processing circuits configured to generate the diversity sample sets, hypothesize the relative symbol alignments, and jointly determine the preferred synchronization position and relative symbol alignment as described in the above method. While different embodiments of the receiver circuit may use different evaluation methods to determine the preferred relative symbol alignment and synchronization position, one or more embodiments jointly determine the combined relative symbol alignment and synchronization position selections that yield a maximum correlation response between the diversity sample sets and a known training sequence over a defined synchronization window.

For example, for each hypothesized relative symbol alignment, correlation responses are determined for respective ones of a number of identified channel delays that stand as synchronization position candidates. By evaluating correlation responses for different hypothesized relative symbol alignments and candidate synchronization positions, an appropriately configured receiver can determine the combination of relative symbol alignment and synchronization corresponding to the most favorable correlation results, and use that combination for processing the diversity sample sets.

By way of non-limiting example, a communication receiver according to the above methods and apparatus, or variations of them, can be configured for operation with burst-type received signals, such as communication signals defined by the Global Services for Mobile communications standards (GSM). In at least one such embodiment, the communication receiver is configured to jointly determine the synchronization position as the channel delay or tap selection that, in combination with a relative symbol alignment selection, yields the highest correlation response between the diversity samples and a known training sequence, for a defined synchronization window within a received signal burst.

In these and other embodiments, the communication receiver, which may employ Single-Antenna-Interference-Cancellation (SAIC) processing, can be configured to generate the diversity samples sets by over-sampling the received signal. In other embodiments, the diversity sample sets are generated by receiving the received signal on multiple antennas, and generating corresponding antenna-specific sample sets. Thus, the methods and apparatus taught herein can be applied to single-antenna receivers that "create" diversity signals as sub-channel signals obtained by over-sampling a single-antenna received signal, and to actual multi-branch diversity receivers that includes two or more antennas and/or receiver front-ends.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 4 is a logic flow diagram of one embodiment of a method for symbol aligning the diversity signals generated by the receiver of FIG. 3, for example.

FIGS. 8A-8D are diagrams of relative symbol alignment hypotheses for the diversity signal sample sets of FIG. 6.

DETAILED DESCRIPTION OF EMBODIMENTS

Figure 1:
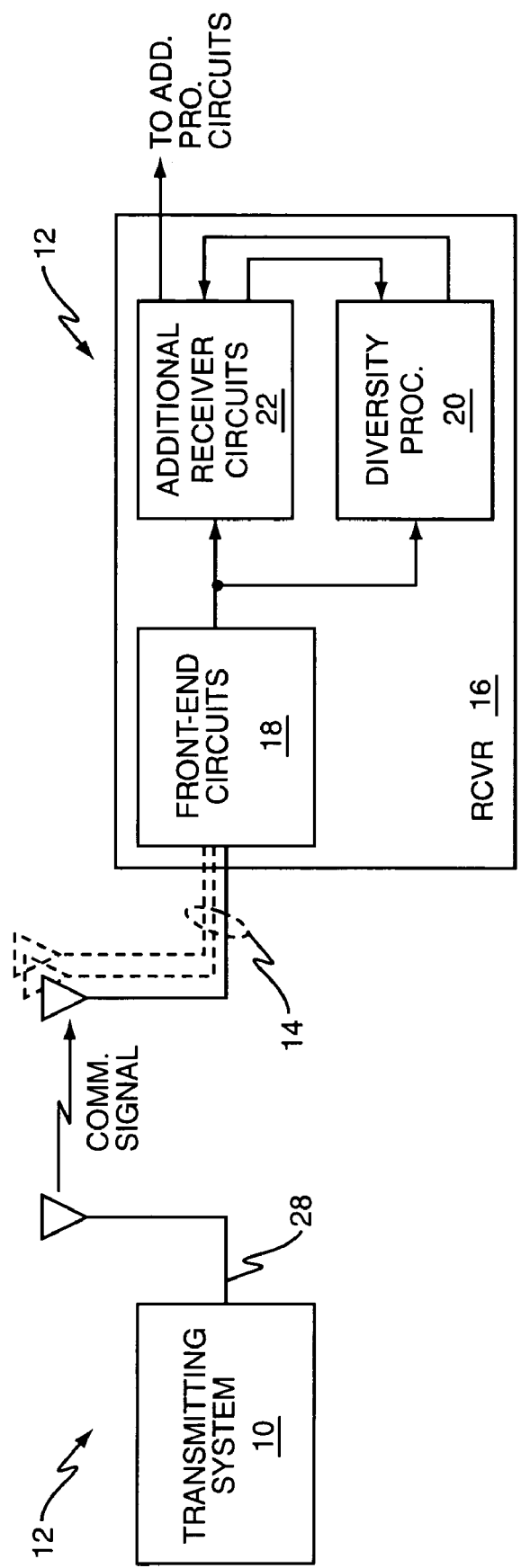
FIG. 1 is a block diagram of one embodiment of transmitting and receiving systems or devices, wherein the receiving system or device includes a receiver circuit configured to carry out diversity signal symbol alignment.

FIG. 1 depicts a transmitting system 10 transmitting a communication signal to a receiving system 12, which comprises one or more receiver antennas 14 and an associated receiver 16, which includes front-end circuits 18, a diversity processor 20, and one or more additional receiver circuits 22, such as demodulators, decoders, etc. Within the context of the illustrated embodiment, the diversity processor 20 provides symbol alignment and selected other processing for diversity signals derived from the received communication signal.

For example, in embodiments where the receiving system 12 includes two or more receiver antennas 14 and the front-end circuits 18 include a corresponding number of front-end branches, the received signal provided to the diversity processor 20 may comprise two or more antenna-specific signal sample streams. Each such stream of antenna-specific samples into the diversity processor 20 represents a different diversity signal sample set. In other embodiments where the receiving system 12 employs a single receive antenna 14, the front-end circuits 18 and/or the diversity processor 20 "create" diversity signals by over-sampling the received signal, e.g., 4× over-sampling yields four diversity sample sets, with each set corresponding to a different sampling phase of the received signal.

The particular embodiment realized for the receiving system 12 depends on its intended use. In the wireless communication network context, the receiving system 12 may comprise all or part of a mobile communication terminal or other wireless communication device. Such embodiments may or may not use multiple receive antennas 14, depending on the set and size concerns. In at least one such embodiment, the receiving system 12 comprises a mobile station or other communication terminal, such as a cellular radiotelephone configured for operation in a GSM/EDGE communication network. Thus, the transmitting system 10 may comprise all or part of a radio base station. Of course, the receiver circuits of particular interest herein, including the diversity processor 20, may be implemented in base stations and other fixed communication receivers, as well as in mobile receivers.

Figure 2:
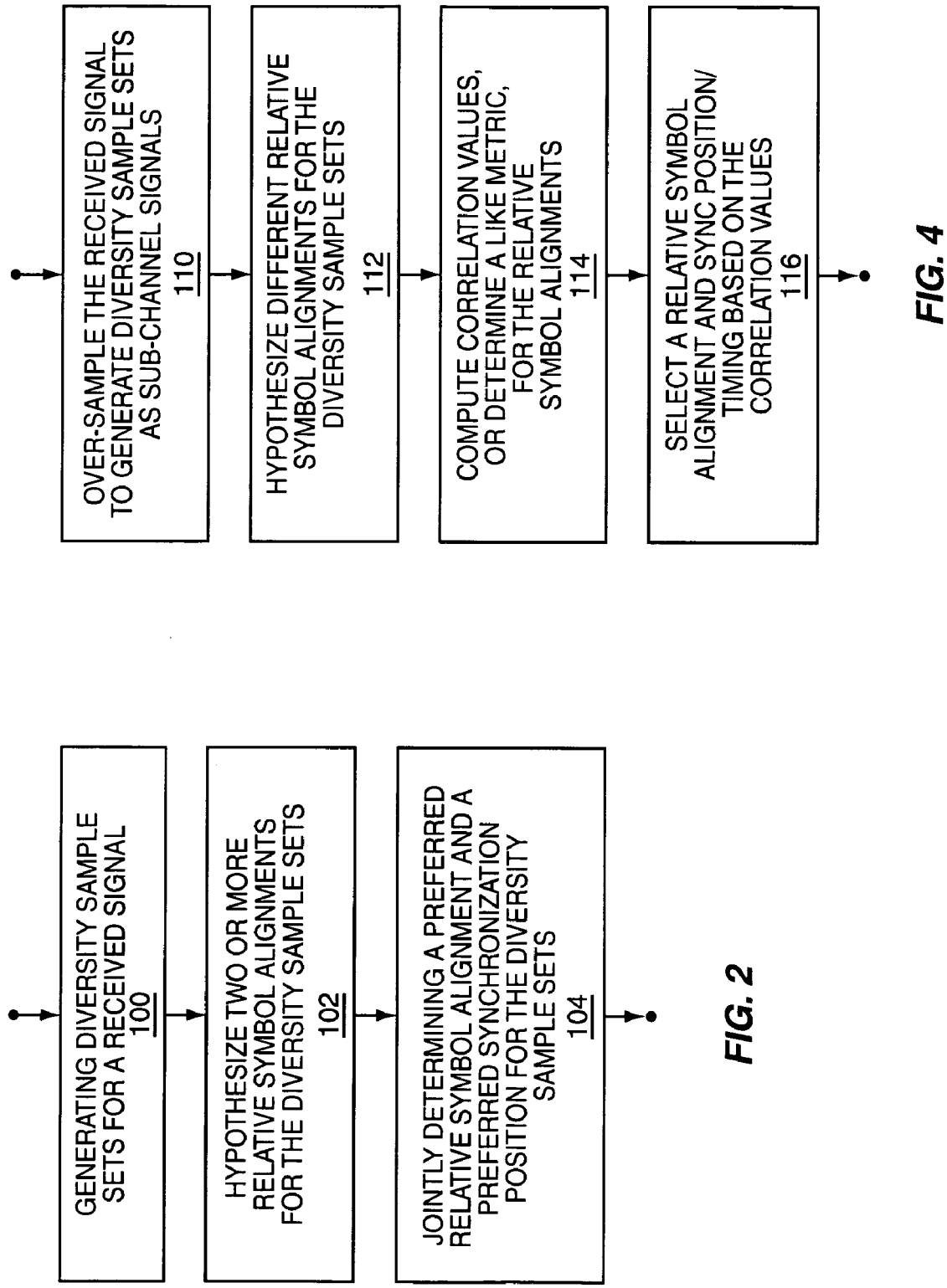
FIG. 2 is a logic flow diagram of one embodiment of a method for symbol aligning diversity signals in a diversity-based communication receiver.

Thus, FIG. 2 illustrates diversity signal processing applicable to fixed and mobile embodiments, and represents signal processing operations for implementation in hardware, software, or any combination thereof. For example, the diversity processor 20 may comprise all or part of a microprocessor, digital signal processor (DSP), Application Specific Integrated Circuit (ASIC), Field Programmable Gate Array (FPGA), or other processing circuit operating according to computer program instructions and/or dedicated hardware. In at least one embodiment, the diversity processor comprises functional resources within a baseband processing system of a communication receiver circuit, which itself may comprise one or more physical processing circuits.

Regardless of its implementation particulars, the diversity processor 20 generates diversity sample sets for a received signal (Step 100). In one or more embodiments, this operation may comprise simply appropriately buffering diversity sample sets received from the front-end circuits 18, based on having multiple antenna-specific received signal sample streams available, or based on over-sampling a received signal incoming in one receiver antenna to create diversity signals. Of course, the diversity processor 20 may include functional circuits not specifically illustrated, such as decimation filtering, etc., as needed to form the diversity sample sets from an over-sampled composite sample stream incoming from the front-end circuits 18.

In any case, the diversity processor 20 hypothesizes two or more relative symbol alignments for the diversity sample sets (Step 102). Processing continues with jointly determining a preferred relative symbol alignment and a preferred synchronization position for the diversity sample sets by evaluating a function that is dependent on relative symbol alignment and synchronization position according to the hypothesized relative symbol alignments and a number of candidate synchronization positions (Step 104).

In this context, the term "preferred" may connote, for example, the combined relative symbol alignment and synchronization position selection corresponding to the most favorable evaluation criteria value arising from function evaluation, which may be the greatest or smallest value, depending on the particular function being used. For example, where the diversity processor 20 determines the evaluation criteria as received signal correlation responses, the relative symbol alignment and synchronization position that yields the highest or strongest correlation response between the diversity samples sets and the known training sequence may be selected as the preferred alignment/synchronization. Note that the receiver 16 may store training sequence information.

Thus, it should be understood that the received signal may include pilot data, training sequences or other known information, which provides a basis for correlating to known information. For example, in one or more embodiments, each diversity sample set comprises a number of symbol-spaced received signal samples taken over a number of received signal symbol intervals, including during synchronization window times corresponding to the transmission of training sequence symbols.

While the receipt of known information within the received signal provides a basis for correlation-based evaluation, other evaluation functions may be used. For example, evaluation criteria can be generated for the hypothesized relative symbol alignments using Least Squares (LS) estimation, minimum noise covariance determinant calculation, or joint signal-interference estimation. Any or all such approaches are contemplated herein for functionally evaluating the hypothesized relative symbol alignments, and provide different bases for jointly determining preferred synchronization positions and preferred relative symbol alignments to be used for processing the received signal. Thus, regardless of the particular algorithm used to generate evaluation criteria for the different relative symbol alignment hypotheses, processing continues with the diversity processor 20 evaluating the evaluation criteria determined for the hypothesized relative symbol alignments to determine the preferred relative symbol alignment.

In one or more embodiments using correlation-based evaluation, the diversity processor 20 identifies a preferred relative symbol alignment for the diversity sample sets and a preferred synchronization position by correlating differently skewed versions of the diversity samples sets against the known training sequence. The correlation values for each relative symbol alignment hypothesis can be generated for different received signal synchronization positions. In other words, the correlation values, which may be expressed as correlation vectors corresponding to different relative symbol alignment hypotheses, may be generated for a number of possible fractional burst synchronization positions. Such fractional-burst synchronization positions may be identified, for example, based on the receiver 16 identifying the dominant channel delays associated with multipath reception of the received signal. In other words, one or more embodiments perform multipath channel estimation to identify the channel taps of interest, and use the estimated channel taps as candidate synchronization positions.

Thus, by evaluating correlation results for different relative symbol alignments among the diversity sample sets and, for each such alignment, generating correlation results for different channel delays, the diversity processor 20 can jointly determine the optimum relative symbol alignment and synchronization position for the received signal. More broadly, whether correlation-based evaluation is used, or a different process is used for generating evaluation criteria, the methods and apparatus taught herein provide a joint synchronization procedure where the best symbol alignment is searched among the hypothesized relative symbol alignments, based on a chosen criteria, thereby resulting in a better receiver performance.

Figure 3:
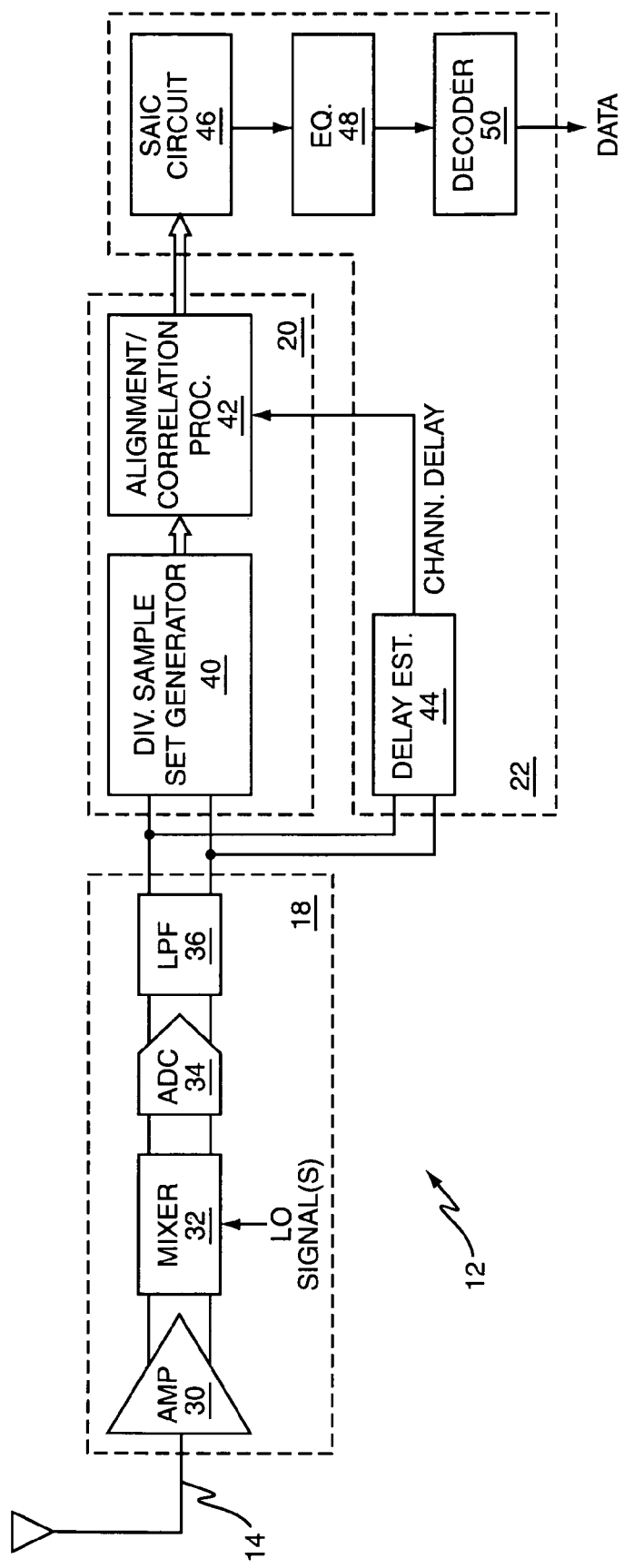
FIG. 3 is a block diagram of one SAIC embodiment of a receiver circuit configured for symbol aligning depicted in FIG. 1, for example.

With the above broad embodiments in mind, FIG. 3 illustrates an embodiment of the receiving system 12, wherein it comprises a mobile station or terminal, such as a cellular radiotelephone, pager, PDA, laptop/palmtop computer, or other type of wireless communication device. More particularly, the receiving system 12 is configured as a communication terminal for use in a TDMA-based, burst-type wireless communication system, with SAIC processing, as enhanced by an embodiment of the previously described diversity processor 20. In one or more particular embodiments, the receiving system 12 comprises a GSM/EDGE communication terminal that uses the diversity processor 20 in conjunction with SAIC processing to suppress co-channel and adjacent channel interference.

The illustrated receiving system 12 includes a single receiver antenna 14, and the front-end circuits 18 include a (low-noise) amplifier 30, a mixer circuit 32, an analog-to-digital converter (ADC) 34, and a low-pass filter circuit 36. Further, the illustrated diversity processor 20 includes, at least functionally, a diversity sample set generator 40, and an alignment/correlation processor 42. In turn, the illustrated additional receiver processing circuits 22 include, at least functionally, a channel delay/tap estimation circuit 44, an SAIC processing circuit 46, an equalizer 48, and a decoder 50. (It should be understood that further circuits, such as transmission circuits for two-way communication and user interface circuits, like a display screen, keypad, audio input/output, etc., may be included in the receiving system 12, depending on its intended use.

In operation, the receiving system 12 uses the diversity processor 20 to identify the preferred synchronization position and relative symbol alignment selections to be used for processing the (over-sampled) received signal. In this context, the front-end circuits 18 provide received signal samples taken over a synchronization window of the received signal, which may comprise a plurality of symbol times during which the transmitting system 10 sends training information, or otherwise sends data known a priori to the receiving system 12. GSM/EDGE systems, for example, periodically transmit Training Sequence Codes (TSCs) to be used by remote receivers for burst synchronization.

Thus, the diversity processor 20 advantageously enables a joint processing method for jointly determining the preferred selections for channel delay selection—i.e., the preferred sub-symbol synchronization position—and relative symbol alignment among the diversity sample sets. Recognizing that the over-sampling phases used to obtain the diversity sample sets potentially cross symbol-time boundaries of the received signal allows the diversity processor 20 to improve the reception performance over conventional receivers, which generally assume diversity signal symbol-alignment. As a further advantage, by incorporating the relative symbol alignment processing into the synchronization position correlation process, these improvements in reception performance come with modest increases in processing complexity.

To better appreciate these and other features and advantages, FIG. 4 illustrates one embodiment of processing logic for the diversity processor 20, wherein such logic is implemented in hardware, software, or any mix thereof. By way of non-limiting example, such processing is set in the context of single-antenna reception of GSM/EDGE communication signals, such as is supported by the receiving system 12 illustrated in FIG. 3.

Processing begins with over-sampling the received signal over a desired number of symbol times within a transmission burst (denoted "normal burst" in GSM) to generate diversity sample sets representing sub-channel signals of the received signal (Step 110). Each such diversity sample set represents symbol-spaced samples of the received signal, taken over a different one of the plurality of over-sampling phases (Step 112).

Processing continues with computing received signal correlation values for the hypothesized relative symbol alignments (Step 114), and selecting a relative symbol alignment for the diversity sample sets and determining a synchronization position for the received signal based on evaluating the correlation values (Step 116). Advantageously, in one or more embodiments of the diversity processor 20, the processing actions denoted as Steps 114 and 116 represent a joint determination process, where the "best" relative symbol alignment is searched based on a chosen criteria, such as a maximum correlation response.

In generating sub-channel signals from a received signal via over-sampling, the over-sampled received signal can be modeled in the baseband using a vectorized Finite Impulse Response (FIR) channel. Thus, the over-sampled received signal in digital baseband form is given as, $$x(n) = \sum_{m=0}^{M} h(m)s(n-m) + u(n) \quad \text{Eq. (1)}$$

where "n" represents a symbol position index for a length N symbol burst of the received signal s "h" represents the propagation channel estimate for the channel tap "m," for channel taps (delay spread) m=0, ..., M, and "u(n)" represents a noise term. ("M" may be considered as the channel "order," given that it indicates the number of channel taps, where there are M+1 channel taps in total.)

Figure 5:
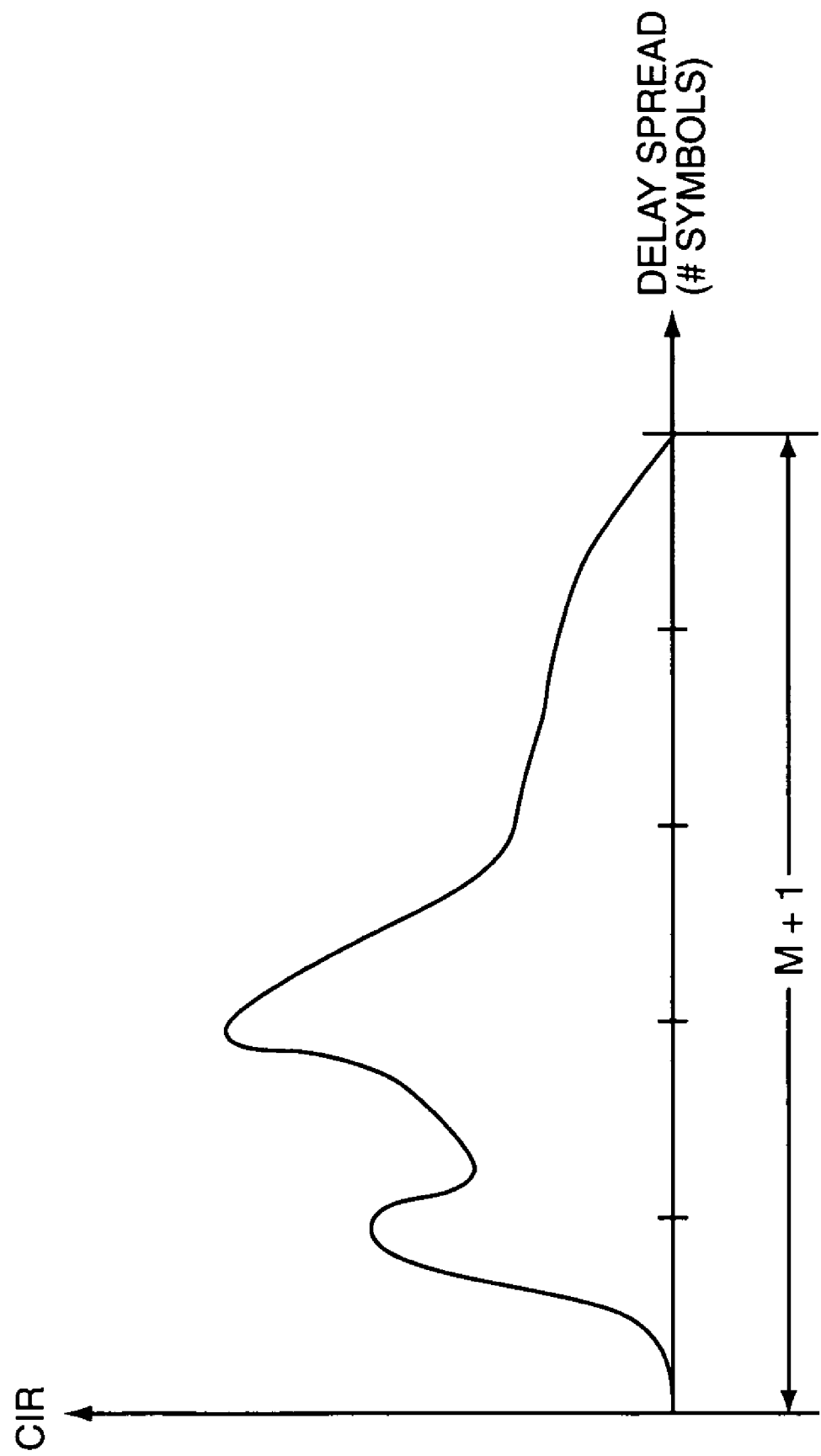
FIG. 5 is a waveform graph of a hypothetical Channel Impulse Response (CIR) for a received (multipath) signal.

FIG. 5, for example, illustrates a hypothetical Channel Impulse Response (CIR) as represented by the "h" values in Eq. (1). The channel illustration demonstrates that a dispersive multipath channel may be characterized by its delay spread, where delay spread may be quantified in terms of symbol times—i.e., by the number of symbol durations. According to the illustration, the maximum delay spread of "M+1" is used to determine the number of channel taps to use in channel estimation and other processing.

Thus, the elements of the received signal vector x(n) are symbol-spaced sub-channel signals—i.e., diversity sample sets—arranged according to their sampling phase. In vector form, the diversity sample sets, x(n), are given as, $$x(n)=[x_0(n)x_1(n) \ldots x_{K-1}(n)] \quad \text{Eq. (2)}$$

where "K" represents number of over-sampling phases used, i.e., the over-sampling factor, such that $x_k(n)$ represents the set of symbol-spaced samples collected from the received signal at the k th over-sampling phase. Thus, each sub-channel signal represented by the corresponding diversity sample set is given as, $$x_k(n) = x\left(\left(n + \frac{k}{K}\right)T\right) \quad \text{Eq. (3)}$$
$$= \sum_{m=0}^{M} h\left(\left(m + \frac{k}{K}\right)T\right)s(n-m) + u\left(\left(n + \frac{k}{K}\right)T\right),$$
$$k = 0, \ldots, K-1$$

For complex sub-channel signals, $x_k(n)$ may be represented in the baseband as, $$x_k(n)=x_k^I(n)+jx_k^Q(n) \quad \text{Eq. (4)}$$

where the "I" superscript denotes the in-phase (real) component and the "Q" superscript denotes the quadrature (imaginary) component.

Figure 6:
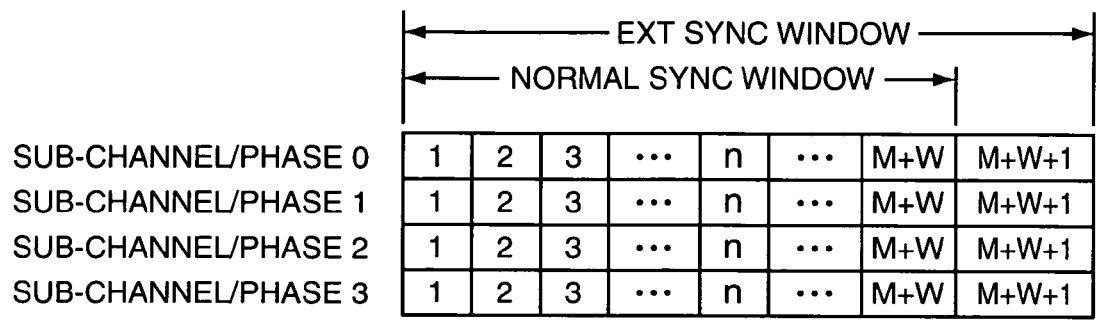
FIG. 6 is a diagram of example diversity sample sets.
Figure 7:
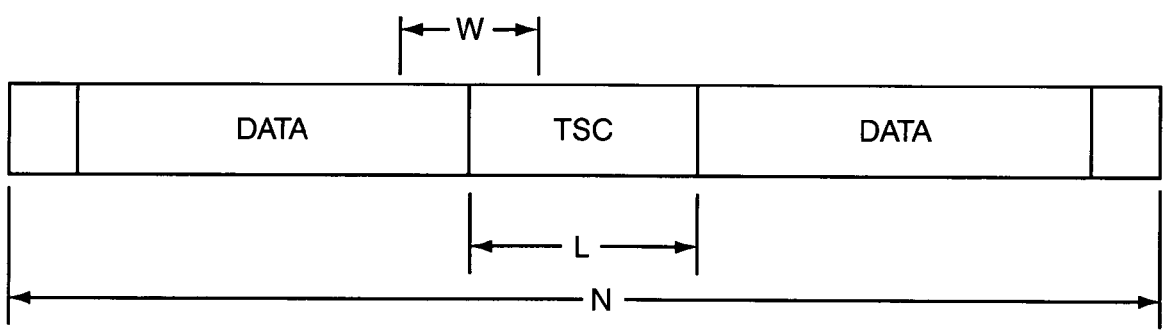
FIG. 7 is a diagram of a hypothetical synchronization window (W) relative to an N symbol-time duration of a received signal.

FIG. 6 illustrates such sampling by depicting four diversity sample sets (K=4, k=0, 1, 2, 3), taken over an extended synchronization window. FIG. 7 aids in understanding the window by depicting a received signal burst of N symbol times, including two (unknown) data portions and a middle TSC portion—i.e., known training data. The "normal" burst length varies by signal type. For example, in GSM system, a burst length of 156 symbols may be used.

The receiver 16 uses the synchronization window "W" to detect the start of the training sequence, but, because of multipath, such synchronization must consider the delay spread of the channel. Where received signal/TSC correlation is used for synchronization detection, the sum of the energy of consecutive M+1 correlations is used to detect the synchronization (sync) position $p_{sync}$.

In a conventional synchronization approach, correlation for sync detection is performed for W+(M+1)−1 positions, i.e., at W+M positions. However, according to one or more embodiments taught herein for determining a preferred relative symbol alignment jointly with synchronization position determination, synchronization correlation is performed at one (or more) additional positions, e.g., W+M+1 positions. (In at least one embodiment taught herein, each such correlation involves correlating L training symbols with the received signal.) Typical (but non-limiting) values for W are "3" or "5," while typical (but non-limiting) values for M are "3" in for typical urban settings and "6" for hilly terrain settings.

In any case, the extended synchronization window encompasses more symbol times than spanned by the nominal synchronization window. Extending the window allows the diversity processor 20 to hypothesize different relative symbol alignments among the diversity sample sets, based on shifting one or more individual ones of the diversity sample sets relative to the others. The number of symbol times by which the synchronization window should be extended to support relative symbol alignment hypothesizing is a function of signal type, the delay spread of the channel, and, in multiple-antenna embodiments, the spatial separation of the receive antennas 14.

With the above in mind, FIGS. 8A-8D illustrate four different relative symbol alignment hypotheses for an embodiment having four diversity sample sets, such as was depicted in FIG. 6. Specifically, Hypothesis 1 illustrated in FIG. 8A assumes that the diversity sample sets obtained at over-sampling phases 0, 1, 2, and 3, all are symbol aligned. Thus, the first hypothesis can be understood as a default, or nominal alignment condition. In contrast, Hypothesis 2 illustrated in FIG. 8B assumes that the diversity sample set obtained at over-sampling phase 0 is left-shifted by one symbol time relative to the remaining diversity sample sets corresponding to over-sampling phases 1, 2, and 3. Similarly, FIG. 8C assumes that the diversity sample sets obtained at the first two over-sampling phases (0 and 1) are left-shifted by one symbol time relative to diversity sample sets obtained at the last two over-sampling phases (2 and 3). Finally, FIG. 8D assumes that the diversity sample sets obtained at over-sampling phases 0, 1, and 2, all are left-shifted by one symbol time relative to the remaining diversity sample set corresponding to over-sampling phase 3.

Notably, for instances such as the working example, the diversity sample sets are obtained by over-sampling the received signal in a known, deterministic sampling order, which limits the number of relative symbol alignments possible for the diversity sample sets. Thus, in one or more embodiments, the diversity processor 20 is configured to hypothesize the relative symbol alignments that are possible for a known over-sampling phase order used to generate the diversity sample sets, and thereby limit the number of hypotheses to be evaluated.

The diversity processor 20 is, in one or more embodiments, configured to select a relative symbol alignment for the diversity sample sets and determine a synchronization position for the received signal jointly. Specifically, one or more embodiments of the diversity processor 20 jointly determines the relative symbol alignment and channel delay value that yields a highest ("best") evaluation criteria, such as the greatest correlation response between the diversity sample sets and a known training sequence taken over the defined synchronization window, such as illustrated in FIG. 7.

By way of non-limiting example, and as a basis for understanding embodiments that use correlation responses for the hypothesized symbol alignments as the evaluation criteria, a conventional synchronization position determination may be given as, $$p_{sync} = \operatorname*{argmax}_{n} \sum_{m=0}^{M} |c(n+m)|^2, \qquad \text{Eq. (5)}$$

$$n = 0, \ldots, W-1$$

where W is the synchronization window, n is the symbol time and m indexes the channel tap delays. Each element in the vector valued $$c(n) = [c_0(n) c_1(n) \ldots c_{K-1}(n)] \qquad \text{Eq. (6)}$$

can be obtained from the correlation of the L symbols of TSC with the received signal in each diversity sample set (sub-channel signal) according to $$c_k(n) = \sum_{i=0}^{L-1} x_k(n+i) t(i), \qquad \text{Eq. (7)}$$

$$n = 0, \ldots, M+W;$$

$$k = 0, \ldots, K-1$$

where i represents a symbol time index for the training sequence and ranges from i=0 to i=L−1, t(i) is the training symbol value for position i, and $x_k(\cdot)$ is as given in Eq. (3), but where the received signal symbol time is n+i for correlation evaluation.

In contrast to the above, a method proposed herein for jointly determinating relative symbol alignment and synchronization position based on correlation processing adds at least one more symbol position for the correlation calculations. Thus, the correlation vector entries are given as, $$c_k(n) = \sum_{i=0}^{L-1} x_k(n+i) t(i), \qquad \text{Eq. (8)}$$

$$n = 0, \ldots, M+W+1;$$

$$k = 0, \ldots, K-1$$

where the correlation window is extended by one symbol time (M+W+1). Eq. (8) allows the diversity processor 20 to construct a new vector with skewed elements of c(n), which is given as, $$d_k(n) = [c_0(n+1) \ldots c_{k-1}(n+1) c_k(n) \ldots c_{K-1}(n)] \qquad \text{Eq. (9)}$$

Eq. (9) may be understood as providing a basis for determining which one among a number of hypothesized relative symbol alignments between the diversity sample sets is preferred. For example, Referring back to FIGS. 8A-8D aids in understanding Eq. (9). In FIG. 8A, the correlation response vector Eq. (9) is determined with none of the diversity sample sets relatively shifted; in FIG. 8B, the correlation response vector is determined for the first diversity sample set being left-shifted by one symbol time relative to the remaining three diversity sample sets. Likewise, in FIGS. 8C and 8D, the first two and first three diversity sample sets, respectively, are left-shifted by one symbol time relative to the remaining diversity sample set(s).

Thus, one or more embodiments of the diversity processor 20 are configured to use the skewed correlation response vectors to jointly determine the preferred relative symbol alignment and the preferred synchronization position by performing a two-argument search for maximization of $$p_{sync} = \operatorname*{argmax}_{k,n} \sum_{m=0}^{M} |d_k(n+m)|^2, \qquad \text{Eq. (10)}$$

$$n = 0, \ldots, W-1$$

(Note, that due to the ordered sampling used to generate the diversity signals used for this example, the size of the search space is only W×K). Once the sync position is determined with k>0, the signals in the first k sub-channels are shifted with one symbol, thus a joint multi-channel synchronization with optimum symbol alignment according to maximal channel tap energy is obtained. That is, by evaluating the correlation response for each hypothesized relative symbol alignment over the range of channel taps, the diversity processor 20 jointly determines the preferred synchronization position and relative symbol alignment.

Of course, as noted before, other methods besides correlation response may be used to evaluate the preferred relative symbol alignment and synchronization position. In general, those skilled in the art will recognize that diversity signal symbol alignment and synchronization position determination relate to channel estimation processing. Thus, correlation function stand as just one example of a joint-determination function that is dependent on channel energy. Thus, joint determination of the preferred synchronization position and relative symbol alignment may use functions other than received signal correlation response. By way of non-limiting examples, the diversity processor 20 may be configured to use one of a least squares estimation function, a minimum predicted error function, a maximum likelihood function, or a minimum noise covariance function.

In all such cases, the functions directly or indirectly depend on relative symbol alignment and synchronization position. With those dependencies, function results may be evaluated for the different hypothesized relative symbol alignments and candidate synchronization positions, to jointly determine preferred selections for those items. Thus, those skilled in the art will appreciate that the diversity processor 20 can be configured to carry out joint determination of preferred relative symbol alignment and synchronization position according to evaluation criteria developed in a number of different ways.

Regardless, the diversity processor 20 determines the synchronization position and the relative diversity sample set alignment to use for processing the diversity sample sets, including samples corresponding to non-training (data) portions of the received signal. For example, in the embodiment of the receiving system 12 as illustrated in FIG. 3, the SAIC circuit 46 applies an SAIC process, including spatial temporal whitening, to the diversity sample sets according to the determined relative symbol alignment and synchronization position. The interference-suppressed samples output by the SAIC circuit 46 go into an equalization circuit 48, and the resultant equalized received signal samples are decoded by decoder 50. The decoded information is then processed accordingly. For example, in mobile station embodiments of the receiving system 12, such data may be signaling or control information, voice data, Internet Protocol (IP) packet data, etc.

Of course, the present invention is not limited by the foregoing discussion, nor is it limited by the accompanying drawings. Indeed, the present invention is limited only by the following claims, and their legal equivalents.

What is claimed is:

1. A method of symbol aligning diversity signals in a communication receiver comprising:
   generating diversity sample sets for a received signal;
   hypothesizing two or more relative symbol alignments for the diversity sample sets; and
   jointly determining a preferred relative symbol alignment and a preferred synchronization position for the diversity sample sets by evaluating a function that is dependent on relative symbol alignment and synchronization position according to the hypothesized relative symbol alignments and a number of candidate synchronization positions.

2. The method of claim 1, wherein generating diversity sample sets for a received signal comprises over-sampling the received signal, such that each diversity sample set comprises a symbol-spaced sample set taken at a different sampling phase over a common sampling window.

3. The method of claim 2, wherein hypothesizing two or more relative symbol alignments for the diversity sample sets comprises hypothesizing the relative symbol alignments that are possible for a known over-sampling phase order used to generate the diversity sample sets.

4. The method of claim 3, further comprising using the preferred synchronization position and the preferred relative symbol alignment to process the diversity sample sets in a single-antenna-interference-cancellation (SAIC) process implemented in the communication receiver.

5. The method of claim 1, further comprising determining the candidate synchronization positions based on estimating multipath propagation channel delays associated with the received signal.

6. The method of claim 1, wherein evaluating a function that is dependent on relative symbol alignment and synchronization position according to the hypothesized relative symbol alignments and a number of candidate synchronization positions comprises evaluating correlation responses of the diversity samples sets relative to a known training sequence in dependence on the hypothesized relative symbol alignments and the candidate synchronization positions.

7. The method of claim 1, wherein jointly determining a preferred relative symbol alignment and a preferred synchronization position for the diversity sample sets by evaluating a function that is dependent on relative symbol alignment and synchronization position according to the hypothesized relative symbol alignments and a number of candidate synchronization positions comprises determining received signal correlation responses relative to a known training sequence for each hypothesized relative symbol alignment and for each candidate synchronization position, and selecting as the preferred relative symbol alignment and synchronization position the combination of hypothesized relative symbol alignment and candidate synchronization position that results in a greatest received signal correlation response.

8. The method of claim 1, further comprising defining the function as a received signal correlation function, and wherein evaluating the function comprises identifying the combination of candidate synchronization position and hypothesized relative symbol alignment that yields a maximum correlation response relative to a known training sequence over a defined synchronization window.

9. The method of claim 8, further comprising defining the synchronization window to be one or more symbol times longer than a nominal synchronization window length, such that the diversity sample sets can be shifted relative to one another by one or more symbol times, as needed to realize the hypothesized relative symbol alignments.

10. The method of claim 1, wherein the communication receiver comprises a diversity receiver receiving the received signal on two or more antennas and wherein generating diversity sample sets for a received signal comprises generating antenna-specific sample sets for the two or more antennas.

11. The method of claim 1, wherein the communication receiver comprises a single-antenna receiver, and wherein generating diversity sample sets for a received signal comprises generating one or more in-phase sample sets and one or more quadrature sample sets for the received signal.

12. The method of claim 11, wherein generating diversity sample sets for the received signal further comprises generating two or more in-phase sub-channel signals and a like number of quadrature sub-channel signals by over-sampling the received signal by a desired over-sampling factor.

13. The method of claim 1, wherein the communication receiver comprises a burst-type receiver, and wherein jointly determining a preferred relative symbol alignment and a preferred synchronization position for the diversity sample sets comprises jointly determining a preferred burst synchronization position for the received signal in conjunction with identifying a preferred one of the hypothesized relative symbol alignments.

14. The method of claim 1, wherein evaluating a function that is dependent on relative symbol alignment and synchronization position according to the hypothesized relative symbol alignments and a number of candidate synchronization positions comprises evaluating one of a received signal correlation response function, a least squares estimation function, a minimum predicted error function, a maximum likelihood function, or a minimum noise covariance function, where all such functions directly or indirectly depend on relative symbol alignment and synchronization position.

15. A receiver circuit configured for symbol aligning diversity signals in a communication receiver, said receiver circuit comprising one or more processing circuits configured to:
   generate diversity sample sets for a received signal;
   hypothesize two or more relative symbol alignments for the diversity sample sets; and
   jointly determine a preferred relative symbol alignment and a preferred synchronization position for the diversity sample sets by evaluating a function that is dependent on relative symbol alignment and synchronization position according to the hypothesized relative symbol alignments and a number of candidate synchronization positions.

16. The receiver circuit of claim 15, wherein the receiver circuit is configured to generate diversity sample sets for a received signal by over-sampling the received signal, such that each diversity sample set comprises a symbol-spaced sample set taken at a different sampling phase over a common sampling window.

17. The receiver circuit of claim 16, wherein the receiver circuit is configured to hypothesize two or more relative symbol alignments for the diversity sample sets by hypothesizing the relative symbol alignments that are possible for an over-sampling phase order used to generate the diversity sample sets.

18. The receiver circuit of claim 17, wherein the receiver circuit is configured to indicate the preferred synchronization position and preferred relative symbol alignment for processing the diversity sample sets in a single-antenna-interference-cancellation (SAIC) process implemented in the communication receiver.

19. The receiver circuit of claim 15, wherein the receiver circuit is configured to determine the candidate synchronization positions based on estimating multipath propagation channel delays associated with the received signal.

20. The receiver circuit of claim 15, wherein the receiver circuit is configured to evaluate a function that is dependent on relative symbol alignment and synchronization position according to the hypothesized relative symbol alignments and a number of candidate synchronization positions by evaluating correlation responses of the diversity samples sets relative to a known training sequence in dependence on the hypothesized relative symbol alignments and the candidate synchronization positions.

21. The receiver circuit of claim 15, wherein the receiver circuit is configured to jointly determine a preferred relative symbol alignment and a preferred synchronization position for the diversity sample sets by evaluating a function that is dependent on relative symbol alignment and synchronization position according to the hypothesized relative symbol alignments and a number of candidate synchronization positions by determining received signal correlation responses relative to a known training sequence for each hypothesized relative symbol alignment and for each candidate synchronization position, and selecting as the preferred relative symbol alignment and synchronization position the combination of hypothesized relative symbol alignment and candidate synchronization position that results in a greatest received signal correlation response.

22. The receiver circuit of claim 15, wherein the receiver circuit is configured to define the function as a received signal correlation function, and to evaluate the function by identifying the combination of candidate synchronization position and hypothesized relative symbol alignment that yields a maximum correlation response relative to a known training sequence over a defined synchronization window.

23. The receiver circuit of claim 22, wherein the receiver circuit is configured to define the synchronization window to be one or more symbol times longer than a nominal synchronization window length, such that the diversity sample sets can be shifted relative to one another by one or more symbol times, as needed to realize the hypothesized relative symbol alignments.

24. The receiver circuit of claim 15, wherein the receiver circuit comprises at least a portion of a diversity receiver configured to receive the received signal on two or more antennas, and wherein the receiver circuit is configured to generate diversity sample sets for a received signal by generating antenna-specific sample sets for the two or more antennas.

25. The receiver circuit of claim 15, wherein the receiver circuit comprises at least a portion of a single-antenna receiver, and wherein the receiver circuit is configured to generate diversity sample sets for a received signal by generating one or more in-phase sample sets and one or more quadrature sample sets for the received signal.

26. The receiver circuit of claim 25, wherein the receiver circuit is configured to generate diversity sample sets for the received signal by further generating two or more in-phase sub-channel signals and a like number of quadrature sub-channel signals, based on over-sampling the received signal by a desired over-sampling factor.

27. The receiver circuit of claim 15, wherein the receiver circuit comprises at least a portion of a burst-type receiver, and wherein the receiver circuit is configured to jointly determine a preferred relative symbol alignment and a preferred synchronization position for the diversity sample sets by jointly determining a preferred burst synchronization position for the received signal in conjunction with identifying a preferred one of the hypothesized relative symbol alignments.

28. The receiver circuit of claim 15, wherein the receiver circuit is configured to evaluate a function that is dependent on relative symbol alignment and synchronization position according to the hypothesized relative symbol alignments and a number of candidate synchronization positions by evaluating one of a received signal correlation response function, a least squares estimation function, a minimum predicted error function, a maximum likelihood function, or a minimum noise covariance function, where all such functions directly or indirectly depend on relative symbol alignment and synchronization position.

29. A wireless communication device comprising:
a communication receiver; and
a receiver circuit included in or associated with the communication receiver, said receiver circuit configured for symbol aligning diversity signals in the communication receiver and comprising one or more processing circuits configured to:
generate diversity sample sets for a received signal;
hypothesize two or more relative symbol alignments for the diversity sample sets; and
jointly determine a preferred relative symbol alignment and a preferred synchronization position for the diversity sample sets by evaluating a function that is dependent on relative symbol alignment and synchronization position according to the hypothesized relative symbol alignments and a number of candidate synchronization positions.

30. The wireless communication device of claim 29, wherein the receiver circuit is configured to generate diversity sample sets for a received signal by over-sampling the received signal, such that each diversity sample set comprises a symbol-spaced sample set taken at a different sampling phase over a common sampling window.

31. The wireless communication device of claim 30, wherein the receiver circuit is configured to hypothesize two or more relative symbol alignments for the diversity sample sets by hypothesizing the relative symbol alignments that are possible for an over-sampling phase order used to generate the diversity sample sets.

32. The wireless communication device of claim 31, wherein the receiver circuit is configured to indicate the preferred synchronization position and relative symbol alignment for processing the diversity sample sets in a single-antenna-interference-cancellation (SAIC) process implemented in the communication device.

33. The wireless communication device of claim 32, wherein the receiver circuit is configured to compute received signal correlation values for the hypothesized relative symbol alignments by, for each hypothesized relative symbol alignment, determining correlation responses for a number of different propagation channel delays.

34. The wireless communication device of claim 29, wherein the receiver circuit is configured to determine the candidate synchronization positions based on estimating multipath propagation channel delays associated with the received signal.

35. The wireless communication device of claim 29, wherein the receiver circuit is configured to evaluate a function that is dependent on relative symbol alignment and synchronization position according to the hypothesized relative symbol alignments and a number of candidate synchronization positions by evaluating correlation responses of the diversity samples sets relative to a known training sequence in dependence on the hypothesized relative symbol alignments and the candidate synchronization positions.

36. The wireless communication device of claim 29, wherein the receiver circuit is configured to jointly determine a preferred relative symbol alignment and a preferred synchronization position for the diversity sample sets by evaluating a function that is dependent on relative symbol alignment and synchronization position according to the hypothesized relative symbol alignments and a number of candidate synchronization positions by determining received signal correlation responses relative to a known training sequence for each hypothesized relative symbol alignment and for each candidate synchronization position, and selecting as the preferred relative symbol alignment and synchronization position the combination of hypothesized relative symbol alignment and candidate synchronization position that results in a greatest received signal correlation response.

37. The wireless communication device of claim 29, wherein the receiver circuit is configured to define the function as a received signal correlation function, and to evaluate the function by identifying the combination of candidate synchronization position and hypothesized relative symbol alignment that yields a maximum correlation response relative to a known training sequence over a defined synchronization window.

38. The wireless communication device of claim 37, wherein the receiver circuit is configured to define the synchronization window to be one or more symbol times longer than a nominal synchronization window length, such that the diversity sample sets can be shifted relative to one another by one or more symbol times, as needed to realize the hypothesized relative symbol alignments.

39. The wireless communication device of claim 29, wherein the wireless communication device comprises a diversity receiver configured to receive the received signal on two or more antennas, and wherein the receiver circuit is configured to generate diversity sample sets for a received signal by generating antenna-specific sample sets for the two or more antennas.

40. The wireless communication device of claim 29, wherein the wireless communication device comprises a single-antenna receiver, and wherein the receiver circuit is configured to generate diversity sample sets for a received signal by generating one or more in-phase sample sets and one or more quadrature sample sets for the received signal.

41. The wireless communication device of claim 40, wherein the receiver circuit is configured to generate diversity sample sets for the received signal by further generating two or more in-phase sub-channel signals and a like number of quadrature sub-channel signals, based on over-sampling the received signal by a desired over-sampling factor.

42. The wireless communication device of claim 29, wherein the wireless communication device comprises a burst-type receiver, and wherein the receiver circuit is configured to jointly determine a preferred relative symbol alignment and a preferred synchronization position for the diversity sample sets by jointly determining a preferred burst synchronization position for the received signal in conjunction with identifying a preferred one of the hypothesized relative symbol alignments.

43. The wireless communication device of claim 29, wherein the receiver circuit is configured to evaluate a function that is dependent on relative symbol alignment and synchronization position according to the hypothesized relative symbol alignments and a number of candidate synchronization positions by evaluating one of a received signal correlation response function, a least squares estimation function, a minimum predicted error function, a maximum likelihood function, or a minimum noise covariance function, where all such functions directly or indirectly depend on relative symbol alignment and synchronization position.

44. A method of symbol aligning diversity signals in a communication receiver comprising:
generating diversity sample sets for a received signal;
hypothesizing two or more relative symbol alignments for the diversity sample sets;
determining correlation values for the diversity sample sets relative to all or part of a known training sequence over a synchronization window, for different combinations of the two or more relative symbol alignments and one or more candidate synchronization positions; and
identifying the combined relative symbol alignment and synchronization position selection that yields a highest correlation value.

* * * * *

UNITED STATES PATENT AND TRADEMARK OFFICE
CERTIFICATE OF CORRECTION

PATENT NO. : 7,599,454 B2
APPLICATION NO. : 11/491832
DATED : October 6, 2009
INVENTOR(S) : He It is certified that error appears in the above-identified patent and that said Letters Patent is hereby corrected as shown below:

On Page 2, item (56), under "OTHER PUBLICATIONS", in Column 2, Line 5, delete "IEE" and insert -- IEEE --, therefor.

In Column 1, Line 46, delete "constrains" and insert -- constraints --, therefor.

In Column 7, Line 25, delete "s" and insert -- "s," --, therefor.

Signed and Sealed this

Twenty-ninth Day of December, 2009

David J. Kappos
*Director of the United States Patent and Trademark Office*

UNITED STATES PATENT AND TRADEMARK OFFICE
CERTIFICATE OF CORRECTION

PATENT NO. : 7,599,454 B2
APPLICATION NO. : 11/491832
DATED : October 6, 2009
INVENTOR(S) : Shousheng He It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 711 days.

Signed and Sealed this

Twenty-eighth Day of September, 2010

David J. Kappos
*Director of the United States Patent and Trademark Office*